(12) United States Patent
Chang

(10) Patent No.: US 6,787,087 B1
(45) Date of Patent: Sep. 7, 2004

(54) METHOD OF FABRICATING A PVC ORNAMENTAL ARTICLE HAVING EFFECTS OF IMITATED MATERIALS

(76) Inventor: Paul Chang, PO Box 82-144, Taipei (TW)

( * ) Notice: Subject to any disclaimer, the term of this patent is extended or adjusted under 35 U.S.C. 154(b) by 0 days.

(21) Appl. No.: 10/388,520

(22) Filed: Mar. 17, 2003

(51) Int. Cl.$^7$ ............................. B29C 33/38; B28B 1/20
(52) U.S. Cl. ...................... 264/221; 264/225; 264/227; 264/250; 264/297.1; 264/311; 264/336; 264/337; 156/245
(58) Field of Search .............................. 264/221, 225, 264/226, 227, 250, 297.1, 311, 328.1, 336, 337; 156/245

(56) References Cited

U.S. PATENT DOCUMENTS 4,495,128 A * 1/1985 Stoffelsma .................. 264/211
4,661,187 A * 4/1987 Beasley ...................... 156/242

FOREIGN PATENT DOCUMENTS

JP        53-71641      *    6/1978

* cited by examiner

Primary Examiner—Melvin C. Mayes
(74) Attorney, Agent, or Firm—Leong C. Lei

(57) ABSTRACT

A method of fabricating a PVC ornamental article having effects of imitated materials includes steps of: (a) mold casting: making a prototype of a desired ornamental article, exploding said prototype into a plurality of blank elements, coating said blank elements with silicone to form hollow silicone molds, injecting a wax material into said hollow silicone molds to obtain a wax object, taking out said wax object for trimming and electroplating said wax object, and melting said wax object to obtain a mold; (b) blank formation: adding colorants into said PVC plastic material and mixing said colorants to obtain desired colors, injecting said PVC plastic material into said mold, utilizing centrifugal force to affix said PVC plastic material onto an inner wall of said mold, and removing molded PVC from said mold to form a blank by force before said molded PVC dries, filling a filler into said blank to increase hardness; and (c) assembly: assembling blanks together and joining the blanks with other decorations to obtain a PVC ornamental article having effects of animated materials such as stone, wood, glass, ceramic, paper, fabric and/or iron, etc.

8 Claims, 7 Drawing Sheets

METHOD OF FABRICATING A PVC ORNAMENTAL ARTICLE HAVING EFFECTS OF IMITATED MATERIALS

BACKGROUND OF THE INVENTION (a) Technical Field of the Invention

The present invention relates to a method of fabricating a PVC ornamental article having effects of imitated materials, and in particular to a method of fabricating a PVC ornamental article which looks like one made of stone, wood, glass, ceramic, paper, fabric and/or cast iron and which is hard in physical property.

(b) Description of the Prior Art

The Conventional method of fabricating ornamental articles is by injection molding which is a manufacturing process for form objects, as of plastic or metal, by heating the molding material until being in a fluid state and injecting it under a high pressure into a mold. Then, the fabricated article is then processed with a coloration step or assembled with other decorations to achieve an attractive ornamental article.

Another conventional fabricating method is achieved by the following procedures: melting a resin material under a high temperature; filling the melted resin into a mold which is integrally made of copper to remove the air bubbles; allowing the melted resin to naturally flow into the mold, or utilizing centrifugal forces to make the melted resin rapidly flow in the mold thereby forming an article with a resinous surface and therefore making it possible to form ornamental articles of various shapes.

However, according to the above conventional methods, only the surface of the plastic article appears to be made of a particular material by a coloring step, but after a certain period of time or having been cleaned by washing, the article will be faded in color. Furthermore, when subject to impact, such an article will easily damaged, making it unable to be used any longer.

Accordingly, it is an object of the present invention to provide a method of fabricating a PVC ornamental article which looks like one made of stone, wood, glass, ceramic, poly, paper, cloth or cast iron and which is hard in physical property.

SUMMARY OF THE INVENTION

It is the primary object of the present invention to provide a method of fabricating PVC ornamental articles which appear to be made of various materials and hard in physical property thus preventing them from breaking when subject to impact.

According to the present invention, the method of fabricating a PVC ornamental article having effects of imitated materials includes the steps of: (a) mold casting: making a prototype of a desired ornamental article, exploding the prototype into a plurality of blank elements, coating the blank elements with silicone to form hollow silicone molds, injecting a wax material into the hollow silicone molds to obtain a wax object, taking out the wax object for trimming and electroplating the wax object, and melting the wax object to obtain a mold; (b) blank formation: adding colorants into PVC plastic material and mixing the colorants to obtain desired colors, injecting the PVC plastic material into the mold, utilizing centrifugal force to affix the PVC plastic material onto an inner wall of the mold, and removing molded PVC from the mold to form a blank by force before the molded PVC dries, filling a filler into the blank to increase hardness; and (c) assembly: assembling blanks together and joining the blanks with other decorations to obtain a PVC ornamental article.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following descriptions provide a convenient illustration for implementing exemplary embodiments of the invention. Various changes to the described embodiments may be made in the function and arrangement of the elements described without departing from the scope of the invention as set forth in the appended claims.

Figure 1:
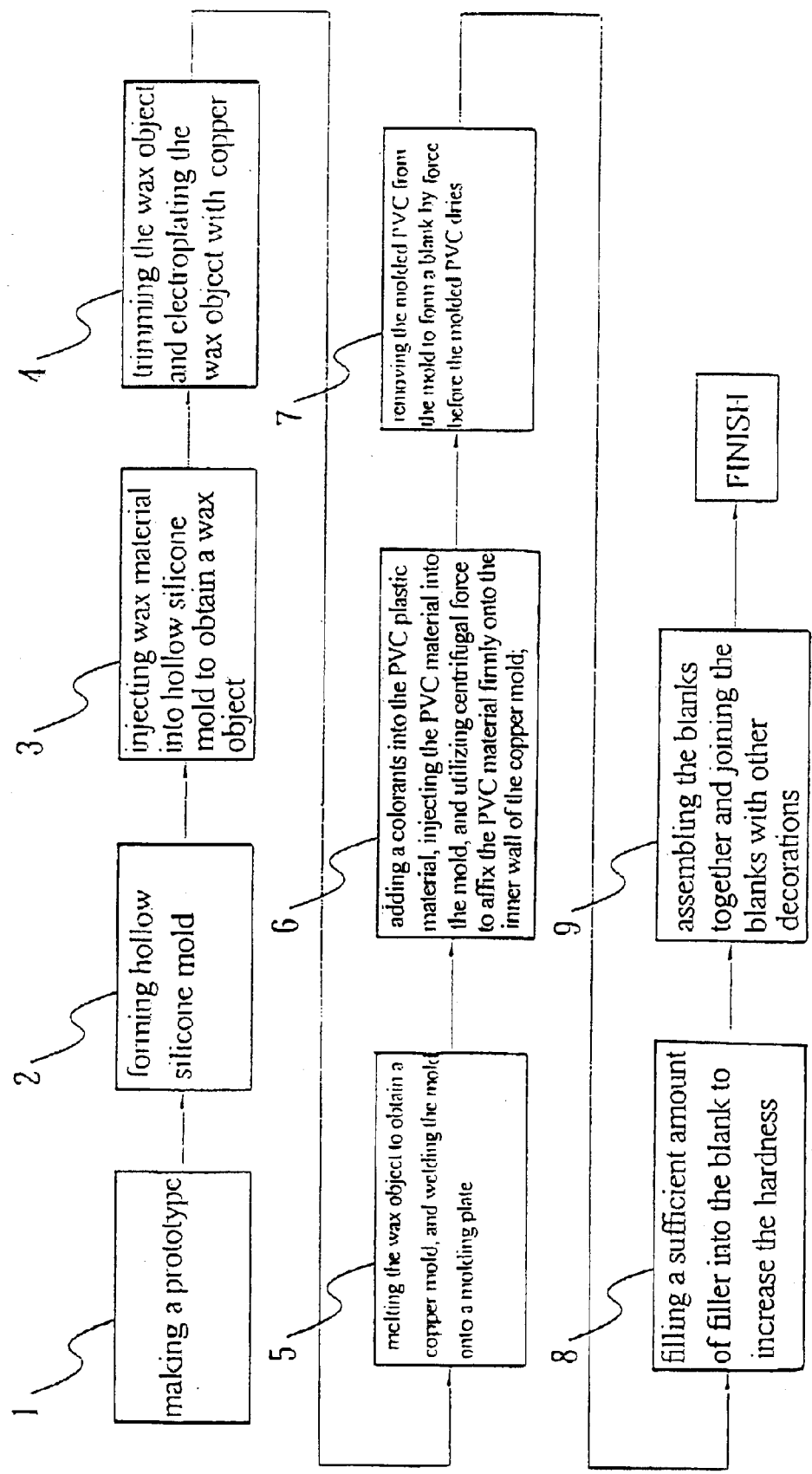
FIG. 1 is a block diagram showing the flowchart of the present invention.
Figure 2:
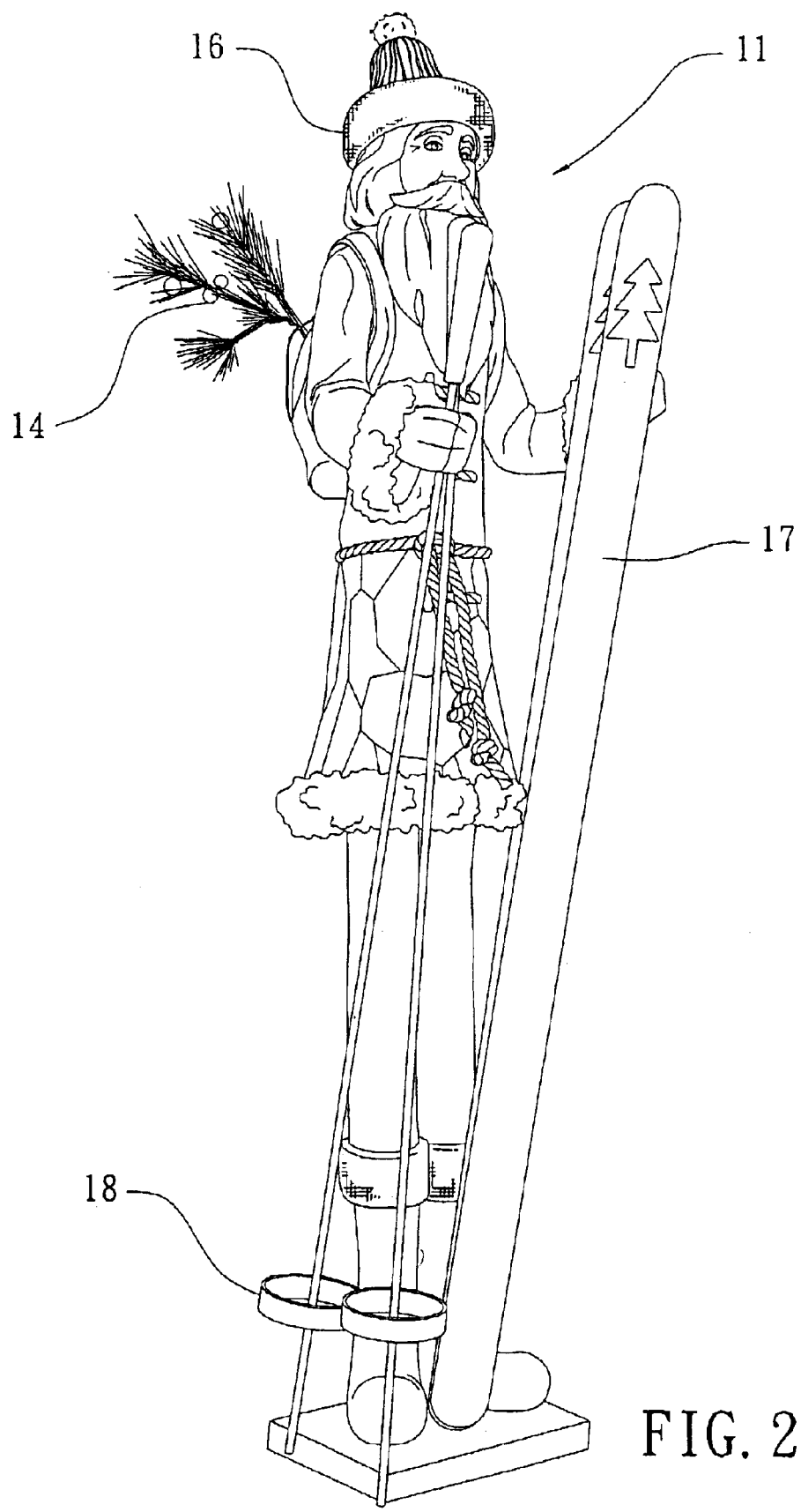
FIG. 2 is a perspective view of an ornamental article in accordance with the present invention.
Figure 3:
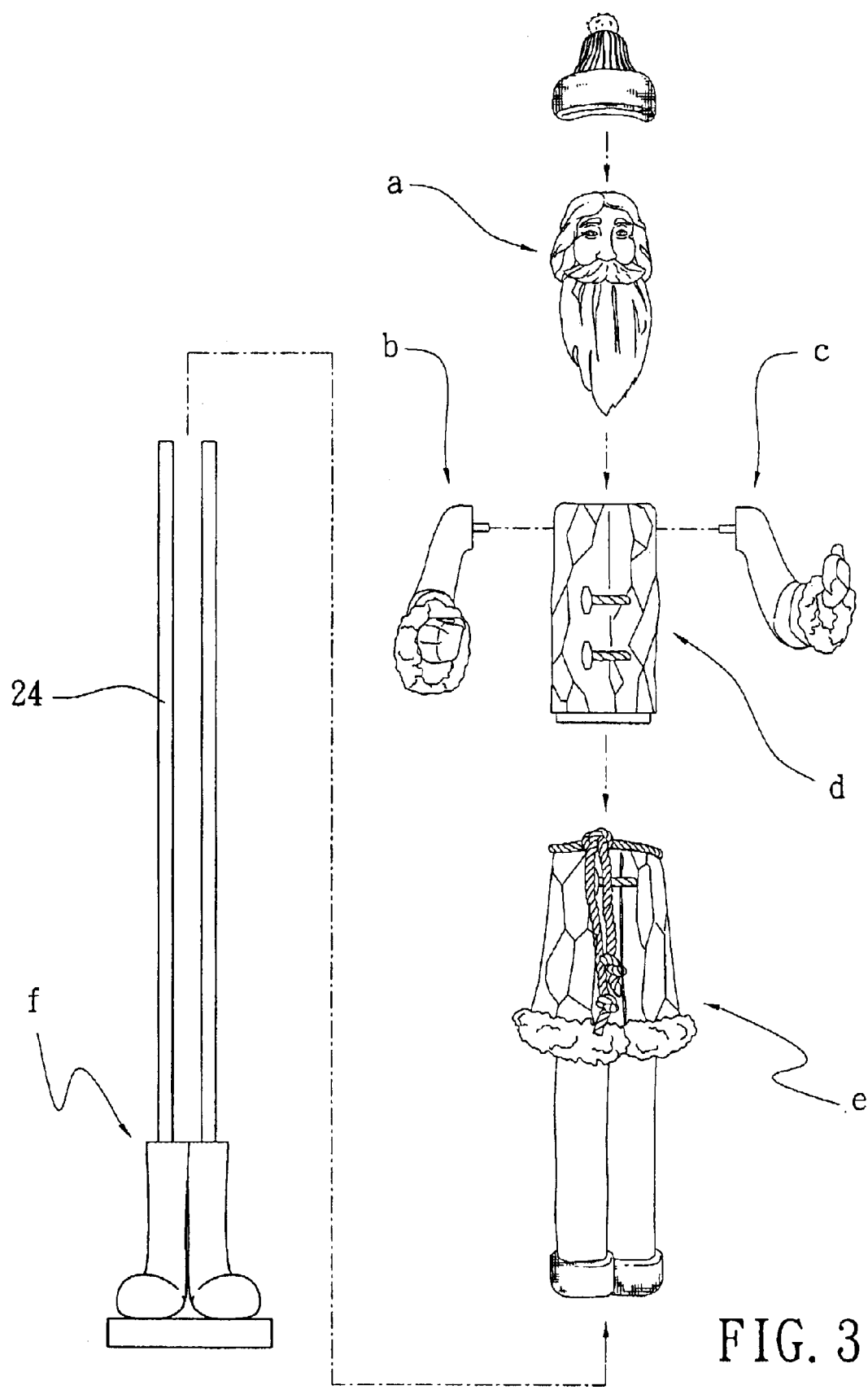
FIG. 3 is an exploded view of the ornamental article in accordance with the present invention.
Figure 4B:
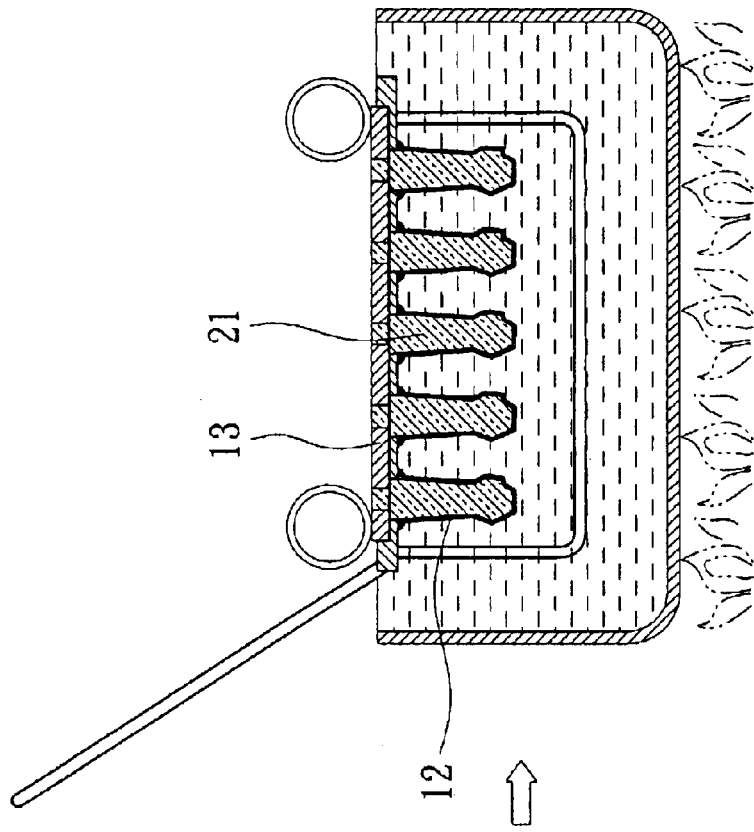
FIGS. 4A, 4B 4C are schematic views of the blank formation steps of the present invention.
Figure 4A:
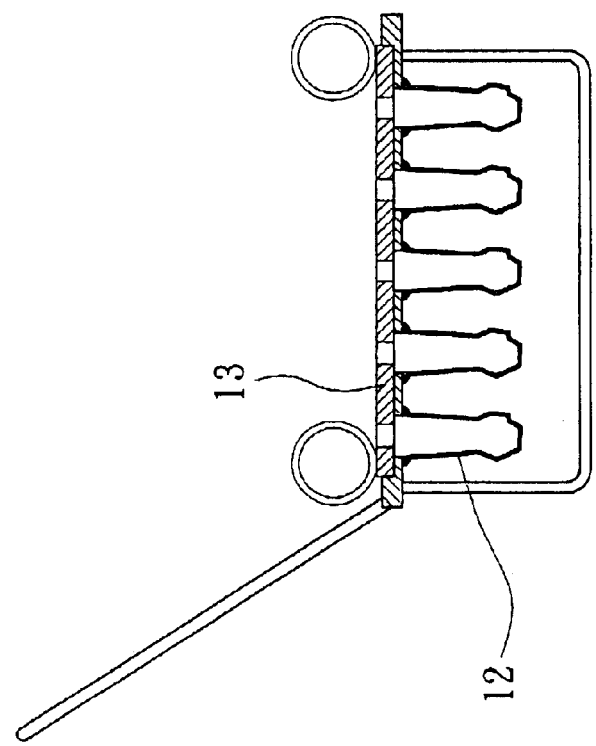
Figure 4C:
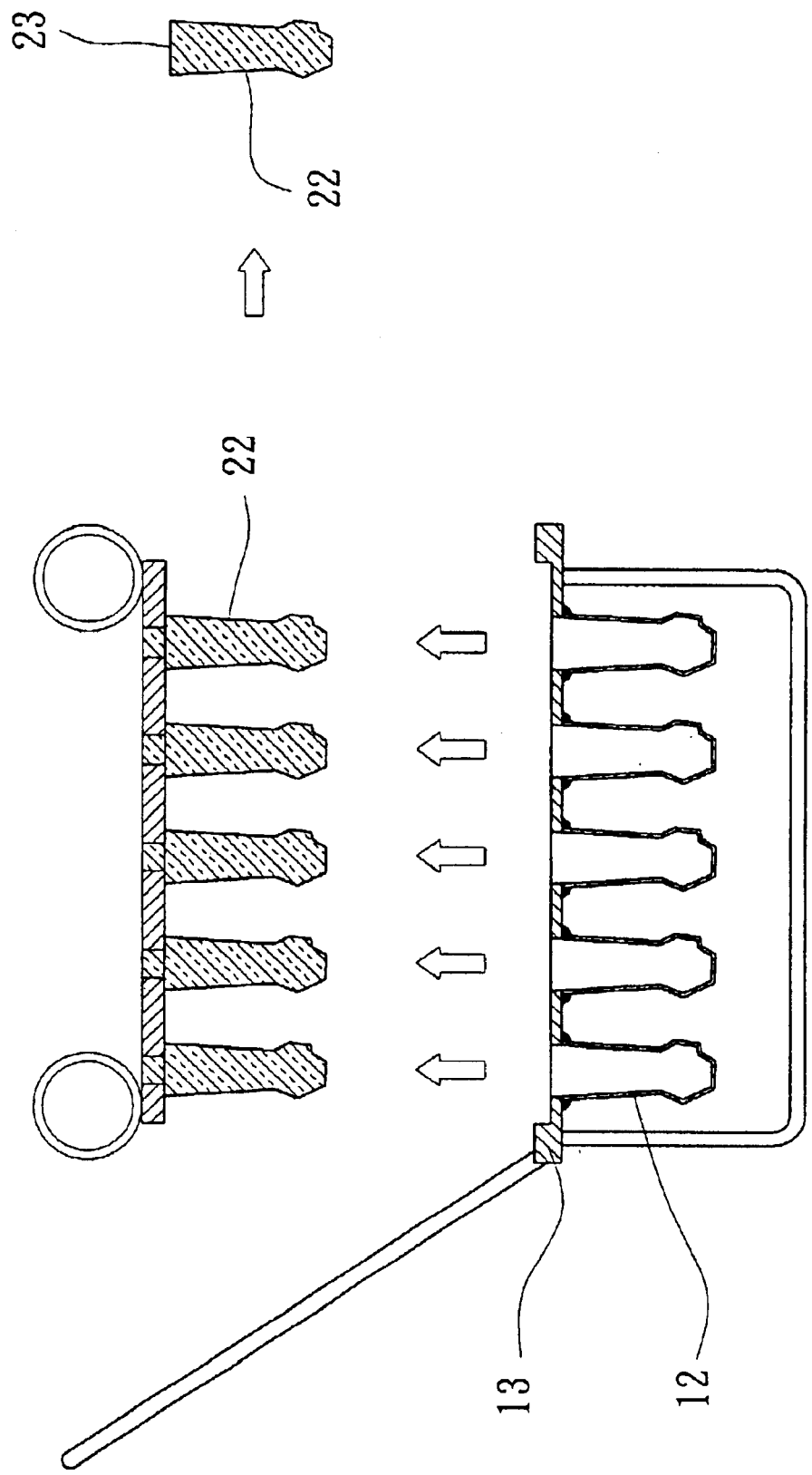

Referring to FIGS. 1, 2 and 3, there shows a method of fabricating a PVC ornamental article with imitated material effects, which comprises the steps of molding, blank formation and assembly.

Figure 6:
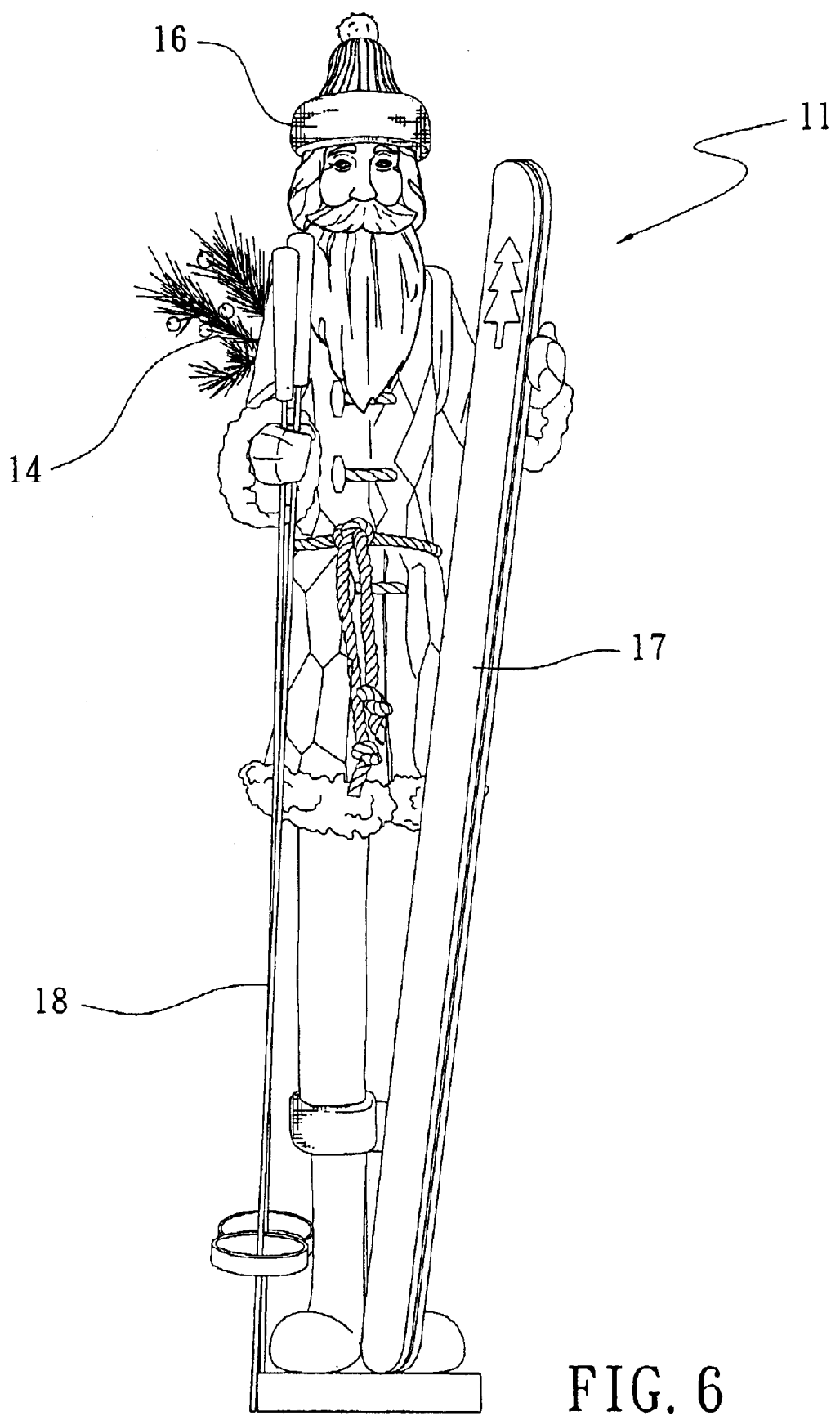
FIG. 6 is a front view of the ornamental article of the present invention.

In accordance with the present invention, the molding process comprises the steps of:

1. making a prototype of the desired ornamental article;
2. exploding the prototype into a plurality of blank elements a, b, c, d, e and f (as shown in FIG. 3), and coating the blank elements with silicone to form hollow silicone molds 2;
3. injecting a wax material into each hollow silicone mold to obtain a wax object;
4. taking out the wax objects for trimming and electroplating the wax objects with copper;
5. melting the wax objects to obtain copper molds 12, and welding the molds 12 onto a molding plate 13 to complete the copper mold formation steps;

6. adding colorants into the PVC plastic material 21, the colorants being mixed to obtain effects appearing to be made of stone, wood, glass, ceramic, resin material, pulp, fabric or cast iron as desired, injecting the PVC material 21 into the molds 12, utilizing centrifugal force to remove air bubbles between the PVC material and the inner wall of the copper molds 12 to affix the PVC material 21 firmly onto the inner wall of the copper molds 12, placing the molds 12 into a trough containing hot oil to provide the PVC with a mobility property to discharge the excessive material;

7. removing the molded PVC from the molds 12 to form blanks 22 by force before the molded PVC dries;

8. filling a sufficient amount of filler 23 into the blanks 22 to increase the hardness, the filler 23 being a foaming agent with compressible property (such as the hardness like wood), the filler 23 being provided with one or more support bodies 24 (the support bodies 24 can be iron bars or wooden bars) at the time of filing, depending on the length of the blanks, so that the support bodies 24 will support the blanks 22 in assembly; and 9. assembling the blanks 22 together and joining the blanks 22 with other decorations such as trigs 14, bags 15, hats 16, sledges 17 and skiing rods 18, . . . etc. as shown in FIGS. 2 and 6, thereby obtaining a PVC ornamental article.

Referring to FIGS. 3, 4A, 4B, and 4C, the prototype 11 is divided into a plurality of parts (as shown in FIG. 3), and the blanks a, b, c, d, e and f and the copper molds 12 (see FIG. 4A) are obtained by steps 1–5. Then each mold 12 is welded onto a mold plate 13 to proceed with the blank formation steps 6 and 7. The PVC plastic material 21 with colorants is injected to the copper mold 12 and the PVC plastic material is affixed onto the inner wall of the mold 12 by way of centrifugal force. By means of centrifugal force the air bubbles between the wall of the mold are removed so that the PVC plastic material is firmly affixed onto the wall of the copper mold 12. The copper mold 12 is placed into a trough of hot oil so that excessive plastic material in the mold can be poured out. The plastic material is then separated from the mold 12 by force to obtain a blank 22 before the PVC plastic material dries. The blank 22 is filled with sufficient filler 23 to increase its hardness. The filler 23 is a foaming agent with compressible property (such as the hardness of wood).

Figure 5:
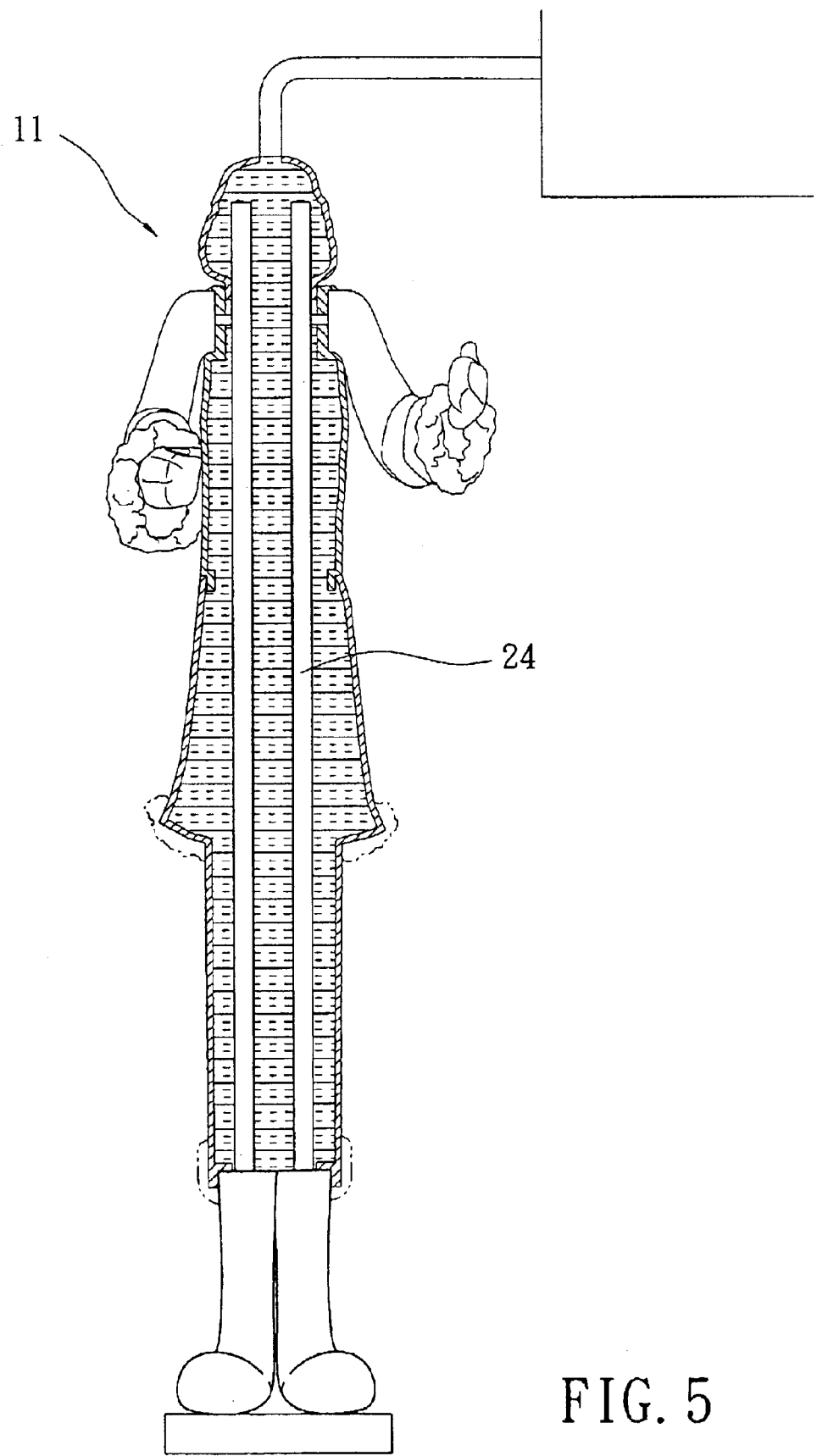
FIG. 5 is a sectional view of the ornamental article in accordance with the present invention after being assembled.

Referring to FIG. 5, in the blank formation step, the filler 23 is added and at least one support body 24 is used depending on the length of the ornamental article so that a tensile force is formed between the blanks 5. The support bodies 24 can be iron bars or wooden bars. During the assembly, the blanks 33 are assembled as shown in FIGS. 2 and 6 and additional ornamental decorations can be added to form a desired ornamental article.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A method of fabricating a PVC ornamental article having effects of imitated materials comprising steps of:

(a) mold casting: making a prototype of a desired ornamental article, exploding said prototype into a plurality of blank elements, coating said blank elements with silicone to form hollow silicone molds, injecting a wax material into said hollow silicone molds to obtain a wax object, taking out said wax object for trimming and electroplating said wax object, and melting said wax object to obtain a mold;

(b) blank formation: adding colorants into PVC plastic material and mixing said colorants to obtain desired colors, injecting said PVC plastic material into said mold, utilizing centrifugal force to affix said PVC plastic material onto an inner wall of said mold, and removing molded PVC from said mold to form a blank by force before said molded PVC dries, filling a filler into said blank to increase hardness; and (c) assembly: assembling blanks together and joining the blanks with other decorations to obtain a PVC ornamental article.

2. The method of claim 1, wherein material for said electroplating is copper.

3. The method of claim 2, wherein the copper mold is mounted onto a molding plate.

4. The method of claim 1, wherein the added colorants are selected from the group consisting of colors of stone material, wooden material, glass, ceramics, resins material, pulp, fabric material and cast iron.

5. The method of claim 1, wherein the filler is a foaming agent.

6. The method of claim 1, wherein the filler is compressible and has a hardness like wood.

7. The method of claim 1, wherein at least one support body is provided to the filler at the time filling, depending on the length of the article, so that said at least one support body may form a tensile force between the blanks.

8. The method of claim 7, wherein the support is a wooden bar or an iron bar.

* * * * *